United States Patent [19]

Smith et al.

[11] 4,006,875
[45] Feb. 8, 1977

[54] PROTECTION EQUIPMENT FOR FLEXIBLE ELONGATED MEMBERS

[75] Inventors: Job Frederick Smith; Owen O'Neill, both of Derby, England

[73] Assignee: Coal Industry (Patents) Limited, London, England

[22] Filed: Dec. 23, 1975

[21] Appl. No.: 643,916

[30] Foreign Application Priority Data
Jan. 3, 1975  United Kingdom ............... 262/75

[52] U.S. Cl. ........................... 248/75; 24/81 CC; 59/78.1; 138/110
[51] Int. Cl.² ................ A62C 23/04; A41B 21/00; F16G 13/00
[58] Field of Search ............... 138/110, 172, 178; 59/78.1; 24/81 CC; 248/75

[56] References Cited

UNITED STATES PATENTS

| | | | |
|---|---|---|---|
| 2,177,128 | 10/1939 | Johnson | 138/110 |
| 2,972,857 | 2/1961 | Bodman | 59/78.1 |
| 3,020,362 | 2/1962 | Waninger | 59/78.1 X |
| 3,779,003 | 12/1973 | Boissevain et al. | 59/78.1 |

Primary Examiner—Paul R. Gilliam
Assistant Examiner—A. M. Calvert
Attorney, Agent, or Firm—Stevens, Davis, Miller & Mosher

[57] ABSTRACT

The cable handling chain is made up of a plurality of links, each comprising a support component pivotally connected to adjacent links and a generally U-shaped retaining component the ends of the limbs of which are releasably secured to the support component to define a closed-sided passage for the cable.

4 Claims, 9 Drawing Figures

PROTECTION EQUIPMENT FOR FLEXIBLE ELONGATED MEMBERS

This invention relates to protection equipment for a flexible elongated member such as, for example, an electrical trailing supply cable to a mining machine traversing to and fro along a longwall mineral face in an underground mine.

Examples of prior known protection equipment are disclosed in the Assignees prior British Patent Specification Nos. 1011432, 1012432 and 1089101. All these examples comprised chains including pivotally connected links which defined at least one open sided, U-shaped trough for receiving the supply cable extending from an anchored station to the traversing mining machine which hauled the chain to and fro along the longwall face. The supply cable was retained in the open sided trough by pins arranged across the mouth of at least some of the links.

Such examples of protection equipment tended to suffer from the disadvantages that the U-shaped links tend to be bulky and relatively difficult to disassemble.

An object of the present invention is to provide improved protection equipment which tends to overcome the above mentioned disadvantages by being compact and relatively easy to disassemble to permit removal of the supply cables when desired.

According to the present invention protection equipment for a flexible elongated member, comprises a link having a support component adapted to be pivotally connected adjacent its ends to two other support components of adjacent links, respectively, and at least one retaining component securable to the support component to define a closed-sided passage extendable around the flexible elongated member which in use passes through the passage.

Preferably, the link has two retaining components securable to opposed sides of the support component, respectively, the components defining two closed-sided passages.

Advantageously, the, or each, retaining component comprises a U-shaped element the ends of the limbs of which are securable to the support component.

Conveniently, each end of the U-shaped element is provided with a through bore for engagement by a pin located in a bore provided in at least one lug on the support component.

The present invention also provides a chain comprising a plurality of links each as defined above.

By way of example only, three embodiments of the present invention will be described with reference to the accompanying drawings, in which.

The links shown in FIGS. 1 to 5 of the drawings constitute protecting equipment, i.e. a chain, for trailing electrical supply cables and hydraulic supply hoses (not shown) leading to a mining machine which traverses to and fro along a longwall mineral face winning mineral from the face. The chain of links is hauled behind the machine with the supply cables and hose protected and supported by this chain which may be guided in a trough extending along the longwall face.

Figure 1:
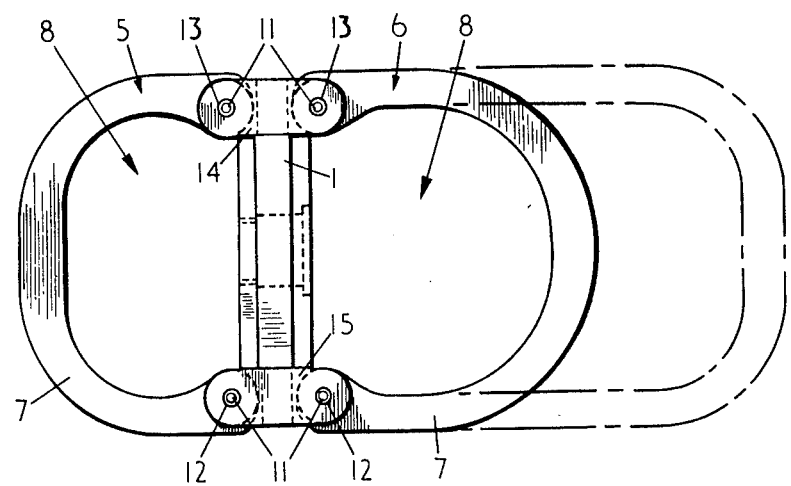
FIG. 1 is a front view of a link constructed in accordance with one embodiment of the present invention.
Figure 2:
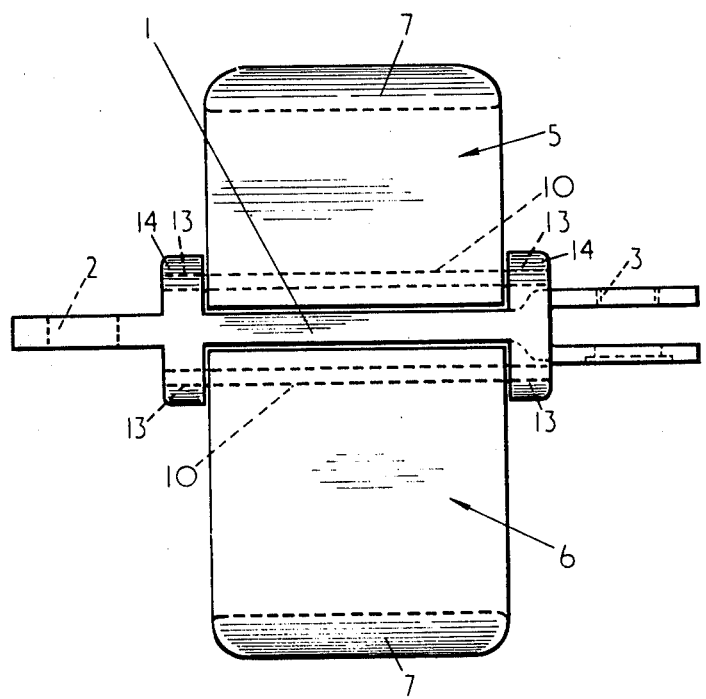
FIG. 2 is a plan of FIG. 1.
Figure 3:
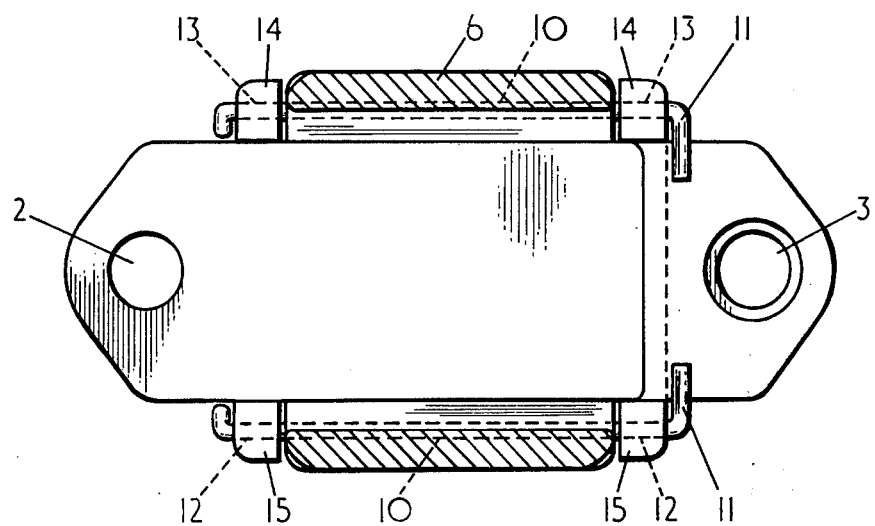
FIG. 3 is a sectional side view of FIG. 1.
Figure 4:
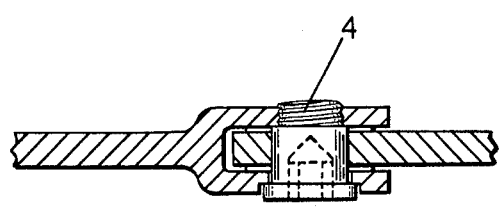
FIG. 4 is a sectional view of a detail of two connected links.
Figure 5:
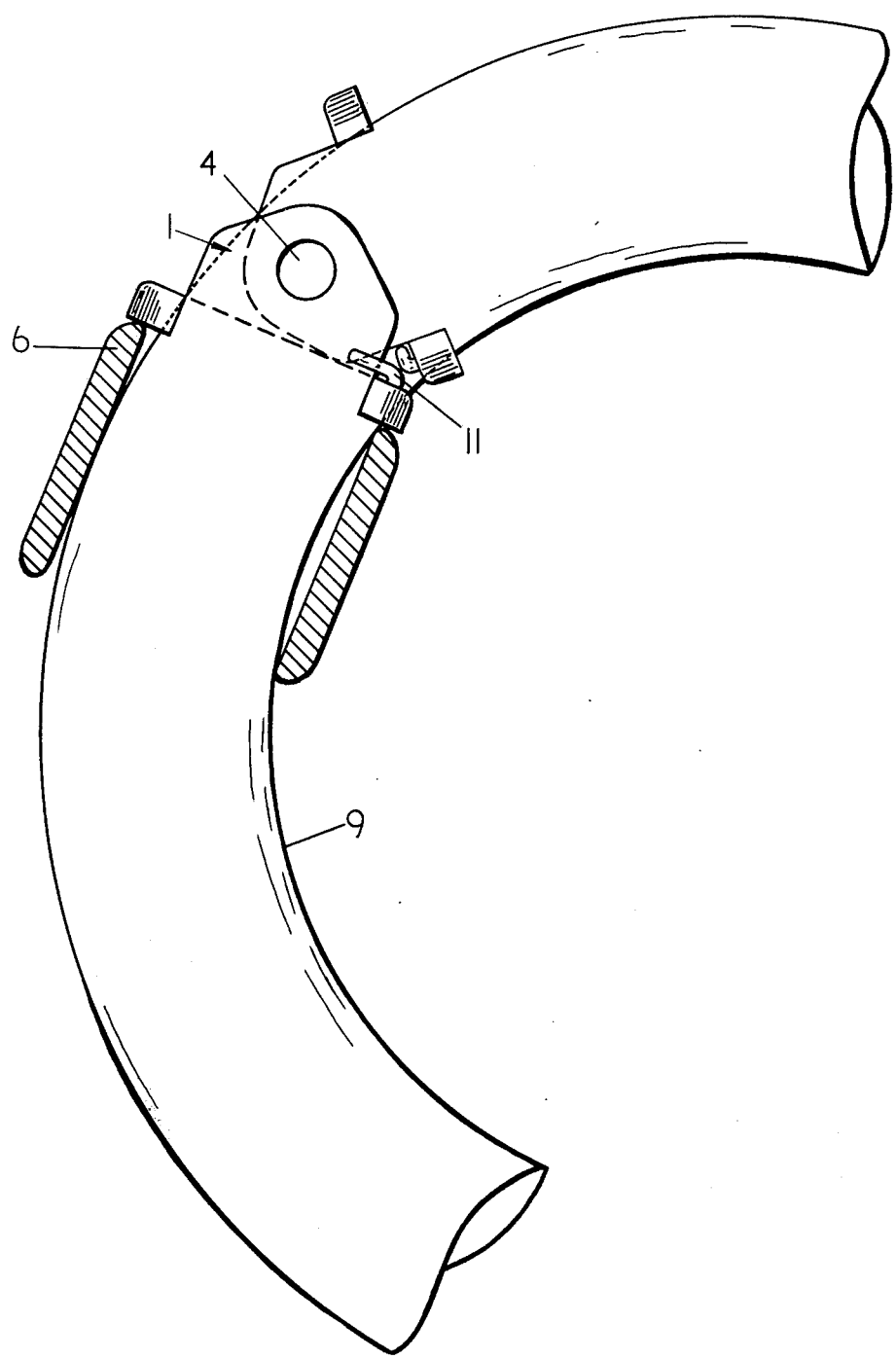
FIG. 5 is an incomplete sectional view of a part of a chain comprising a plurality of links as shown in FIGS. 1 to 4, the links being indicated in a loop.

Referring to the drawings, each link comprises a support component 1 having through bores 2 and 3 for engagement with pivot pins 4 (only one of which is shown in FIG. 4) for pivotally connecting the link to the ends of adjacent links, respectively, (as indicated in FIG. 5). As seen in FIG. 2 one end of the support component is forked for engagement with the adjacent end of the next adjacent link to the right. The other end of the link in FIG. 2 engages within the forked end of the next adjacent link to the left. Thus, a strongly constructed chain is obtained with the links connected for pivotal movement in one plane about the axis of the pivot pins 4.

Two retaining components 5 and 6 are securable on opposite sides of the support component 1, each of the retaining components 5 and 6 comprising a U-shaped element 7 defining a closed-sided passage 8 extendable around the cable and/or hose (not shown in FIGS. 1 to 4 but indicated by 9 in FIG. 5) which in use passes through the passage and having through bores 10 adjacent to the ends of limbs for engagement by retaining pins 11 which also engage in bores 12 and 13 formed in pairs of lugs 14 and 15 provided on the support component. The ends of the retaining pins are bent over to retain the pins in their retaining positions. In the drawing the U-shaped elements 7 are shown with three varying lengths of limbs, the length of the limbs being chosen to suit the diameter and/or number of the supply cables or hoses desired to be accommodated in the link.

In use a plurality of the links are formed into a chain, one end of which is attached to the mining machine so that as it traverses to and fro the chain is hauled behind the machine. When the machine changes direction a loop is formed in the chain (as indicated in FIG. 5).

During movement of this machine the supply cables and hose are accommodated in the closed-sided passages 8 provided by the U-shaped elements which provide adequate protection for the supply cables and hoses.

If it is desired to remove or add a supply cable and/or hose it is a relatively easy task to remove one of the retaining pins 11 associated with one of the retaining components 5 or 6 from a number of adjacent links and hinge back the U-shaped elements 7 to permit free access to the passage 8. When the task is complete the U-shaped elements are pivoted back to the closed or retaining position where the supply cables and/or hose are retained in the protected position. The retaining pins are replaced to retain the U-shaped elements in the closed position. It will be appreciated that as the machine traverses to and fro along the longwall face the supply cables and/or hoses are retained in their protected position within the closed-sided passage.

Figure 6:
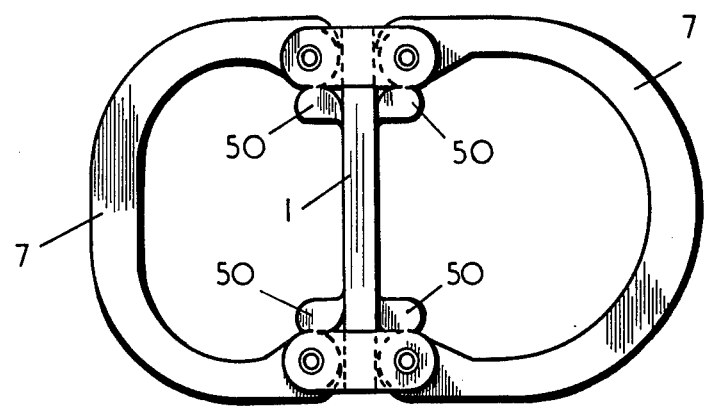
FIG. 6 is an incomplete front view of a link constructed in accordance with a second embodiment of the present invention.
Figure 7:
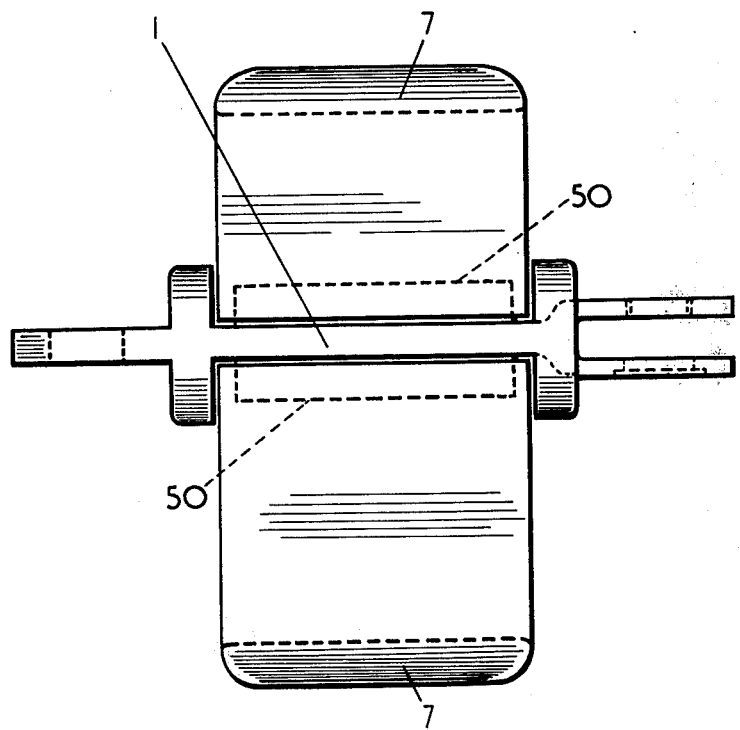
FIG. 7 is a plan of FIG. 6.
Figure 8:
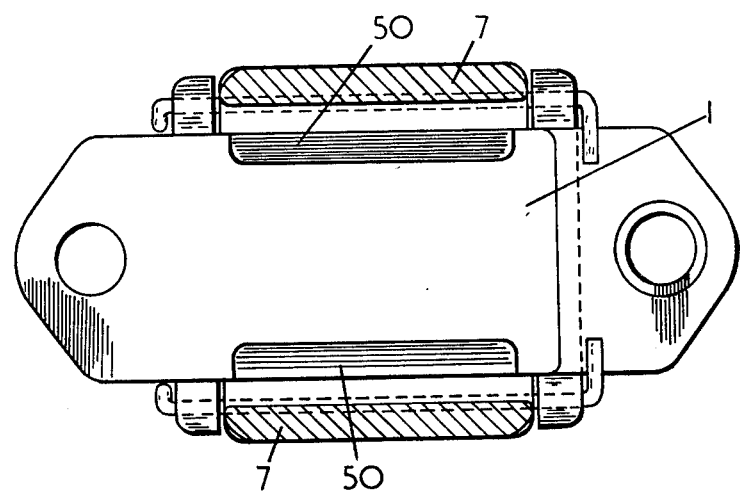
FIG. 8 is a side sectional view of FIG. 6.

Referring now to FIGS. 6 to 8, the drawings show a second embodiment of link similar to the first described embodiment except that abutment shoulders 50 are provided on the support component 1 tending to retain the ends of the limbs of the U-shaped elements 7 apart and reduce any tendency for the limbs to flex. The remaining constructional features of the second embodiment of link are substantially the same as those of the first described link.

Figure 9:
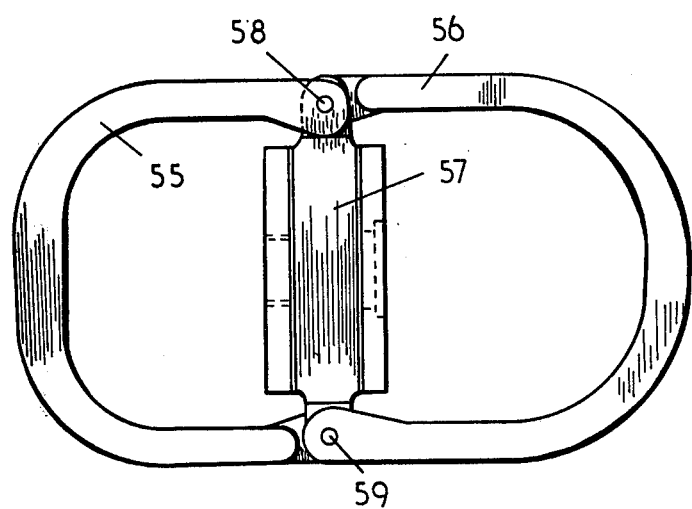
FIG. 9 is a front view of a link constructed in accordance with a third embodiment of the present invention.

FIG. 9 shows a third embodiment of link in which the two retaining components 55 and 56 are retained to the support component 57 by common upper and lower retaining pins 58 and 59. Thus, both cable retaining components can be opened by the removal of one common retaining pin from each link. The remaining constructional details of the link are substantially as those for the first described embodiment.

In other modifications of the invention the link comprises only one retaining component.

In further modifications of the invention each retaining component is attached to the support component by releasable catch means.

We claim:

1. Protection equipment for a plurality of flexible elongated members, comprising a link having a support component adapted to be pivotally connected adjacent its ends to two other support components of adjacent links, respectively, and two retaining components securable to opposed sides of the support component, respectively, to define two closed-sided passages extendable around the flexible elongated members which in use pass through the passages.

2. Equipment as claimed in claim 1, in which the retaining component comprises a U-shaped element the ends of the limbs of which are releasably securable to the support component.

3. Equipment as claimed in claim 2, in which at least one end of the U-shaped element defines a bore, and in which at least one lug is provided on the support component, the lug defining a bore, a pin being locatable in said bores to retain said at least one end of the U-shaped element to the support component.

4. A chain for protecting a plurality of flexible elongated members, comprising a plurality of links, each link having a support component adapted to be pivotally connected adjacent its ends to two other support components of adjacent links, respectively, and two retaining components securable to opposed sides of the support component, respectively, to define two closed-sided passages extendable around the flexible elongated members which in use pass through the passages.

* * * * *